United States Patent [19]

Aichelmann, Jr. et al.

[11] Patent Number: 4,823,259

[45] Date of Patent: Apr. 18, 1989

[54] HIGH SPEED BUFFER STORE ARRANGEMENT FOR QUICK WIDE TRANSFER OF DATA

[75] Inventors: Frederick J. Aichelmann, Jr., Hopewell Junction; Rex H. Blumberg, Hyde Park; David Meltzer, Wappingers Falls; James H. Pomerene, Chappaqua; Thomas R. Puzak, Yorktown Heights; Rudolph N. Rechtschaffen, Scarsdale, all of N.Y.; Frank J. Sparacio, Bergen, N.J.

[73] Assignee: International Business Machines Corporation, Armonk, N.Y.

[21] Appl. No.: 213,506

[22] Filed: Jun. 23, 1988

Related U.S. Application Data

[63] Continuation of Ser. No. 626,089, Jun. 29, 1984, abandoned.

[51] Int. Cl.$^4$ ............................................. G06F 12/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,128,882 | 12/1978 | Dennis | 364/200 |
| 4,141,067 | 2/1979 | McLagan | 364/200 |
| 4,144,566 | 3/1979 | Timsit | 364/200 |
| 4,173,781 | 11/1979 | Cencier | 364/200 |
| 4,228,503 | 10/1980 | Waite et al. | 364/200 |
| 4,323,968 | 4/1982 | Capozzi | 364/200 |
| 4,354,232 | 10/1982 | Ryan | 364/200 |
| 4,442,487 | 4/1984 | Fletcher et al. | 364/200 |
| 4,458,310 | 7/1984 | Chang | 364/200 |
| 4,464,717 | 8/1984 | Keeley et al. | 364/200 |
| 4,489,381 | 12/1984 | Lavallee et al. | 364/200 |
| 4,616,310 | 10/1986 | Dill et al. | 364/200 |

OTHER PUBLICATIONS

Manyi, G. J. et al., "Two-Loop Design In a Two Level Storage Hierarchy", IBM Technical Disclosure Bulletin, vol. 18, No. 8, Jan. 1976, pp. 2609–2610.

Hwang, K. et al., "Computer Architecture and Parallel Processing", McGraw-Hill Book Company, 1984, pp. 98–102.

IBM Technical Disclosure Bulletin, vol. 21, No. 6, Nov. 1978, pp. 2468–2469, "Data Processing System with Second Level Cache", F. Sparacio.

IBM Technical Disclosure Bulletin, vol. 23, No. 7A, Dec. 1980, pp. 2915–1917, "System Cache for High Performance Processors", S. M. Desar.

Primary Examiner—Thomas M. Heckler
Assistant Examiner—Jonathan C. Fairbanks
Attorney, Agent, or Firm—Terry J. Ilardi

[57] ABSTRACT

A high speed buffer store arrangement for use in a data processing system having multiple cache buffer storage units in a hierarchial arrangement permits fast transfer of wide data blocks. On each cache chip, input and output latches are integrated thus avoiding separate intermediate buffering. Input and output latches are interconnected by 64-byte wide data buses so that data blocks can be shifted rapidly from one cache hierarchy level to another and back. Chip-internal feedback connections from output to input latches allow data blocks to be selectively reentered into a cache after reading. An additional register array is provided so that data blocks can be furnished again after transfer from cache to main memory or CPU without accessing the respective cache. Wide data blocks can be transferred within one cycle, thus tying up caches much less in transfer operations, so that they have increased availability.

2 Claims, 6 Drawing Sheets

FIG. 1 STORAGE SYSTEM DATA FLOW

ADDRESSING OF L2 CACHE

HIGH SPEED BUFFER STORE ARRANGEMENT FOR QUICK WIDE TRANSFER OF DATA

This is a continuation of prior Application Ser. No. 06/626,089 filed on June 29, 1984, now abandoned.

FIELD OF THE INVENTION

This invention is concerned with high-speed buffer stores or caches in data processing systems, and in particular with the design and interconnection of multiple caches to enable fast transfer of data sets between the caches, and also between a cache and the main store or processing unit.

BACKGROUND AND PRIOR ART

The use of high-speed buffer stores, often called "caches", for improving the operation of data processing systems is well established in the art. Several systems are known in which a plurality of caches are provided.

U.S. Pat. No. 4,141,067 to A. McLagan discloses a multiprocessor system in which each CPU has its own cache store. Separate latches are provided between each cache store and its CPU to buffer data. No transfer or interaction between the several caches is provided, as each cache serves its own processor.

In U.S. Pat. No. 4,144,566 to C. Timsit, a parallel processor is disclosed having a large number of elementary processors connected in parallel. Each elementary processor has its own normal storage unit and its own small capacity fast storage unit. These fast storage units are interconnected to allow the desired parallel processing. However, no transfer of separate data sets between the fast stores or between a selectable fast store and a single common main store are provided.

U.S. Pat. No. 4,228,503 to J. C. Waite et al. describes a multi-requestor system in which each requestor has its own dedicated cache store. Besides having access to its own cache store for obtaining data, each requestor also has access to all other dedicated cache stores for invalidating a particular data word therein if that same data word has been written by that requestor into its own dedicated cache store. However, a requestor cannot obtain data from another cache which is not its own, and no data transfers between caches are provided.

In U.S. Pat. No. 4,354,232 to C. P. Ryan a computer system is disclosed which has a high-speed cache storage unit. A particular buffer stage is provided between the cache and the main storage and CPU, for storing read and write data transfer commands and associated data. Though flexibility is gained in data transfer, a separate buffer unit and control logic are required solely for this purpose.

The article "Data processing system with second level cache" by F. Sparacio, IBM Technical Disclosure Bulletin, Vol. 21, No. 6, November 1978, pp. 2468-2469, outlines a data processing system having two processors and a two-level cache arrangement between each processor and the common main store. No disclosure is made of the internal organization of the cache stores and of the interconnecting busses and circuits.

An article by S. M. Desar "System cache for high performance processors" which was published in IBM Technical Disclosure Bulletin, Vol. 23, No. 7A, December 1980, pp. 2915-1917 presents a basic block diagram of a data processing system having plural processors each with its own dedicated cache store, and a common system cache in a separate level between the dedicated processor caches and main storage. Also in this article, no details are given on interconnecting busses and circuits and on the internal organization of the cache storage units.

SUMMARY OF THE INVENTION

It is an object of the invention to devise a high-speed buffer storage arrangement having multiple caches with improved data transfer capabilities between caches and between any cache and the main store or a processor.

It is another object to provide a cache buffer organization with improved data transfer capabilities that requires no separate buffer units between the caches or in the data paths.

A further object is to provide a multiple cache buffer system that allows fast transfer of data blocks to and from caches having different access times without the requirement of extra operating cycles for intermediate handling.

The invention for achieving these objects and further advantages is defined in the claims.

The new cache buffer arrangement allows transfer of very large data blocks between storage units within one operation cycle. It is particularly suited for a hierarchical system of high-speed buffers having different speeds and sizes.

Its improved performance is based on special form factors of the internal memory organization, supported by directly-connected on-chip latches which can be provided with separate external control lines.

Due to the transfer of wide data blocks in parallel mode, the cache stores are tied in transfer operations much less than it was necessary in systems where several sequential transfers of smaller data blocks are effected. The requirement for wider data paths and associated circuitry is more than compensated by the much higher availability of the cache buffers which is due to the fast, single-operation block transfers.

An embodiment of the invention is described in the sequel with reference to the drawings.

DETAILED DESCRIPTION

(A) STORAGE SYSTEM DATA FLOW

Figure 1:
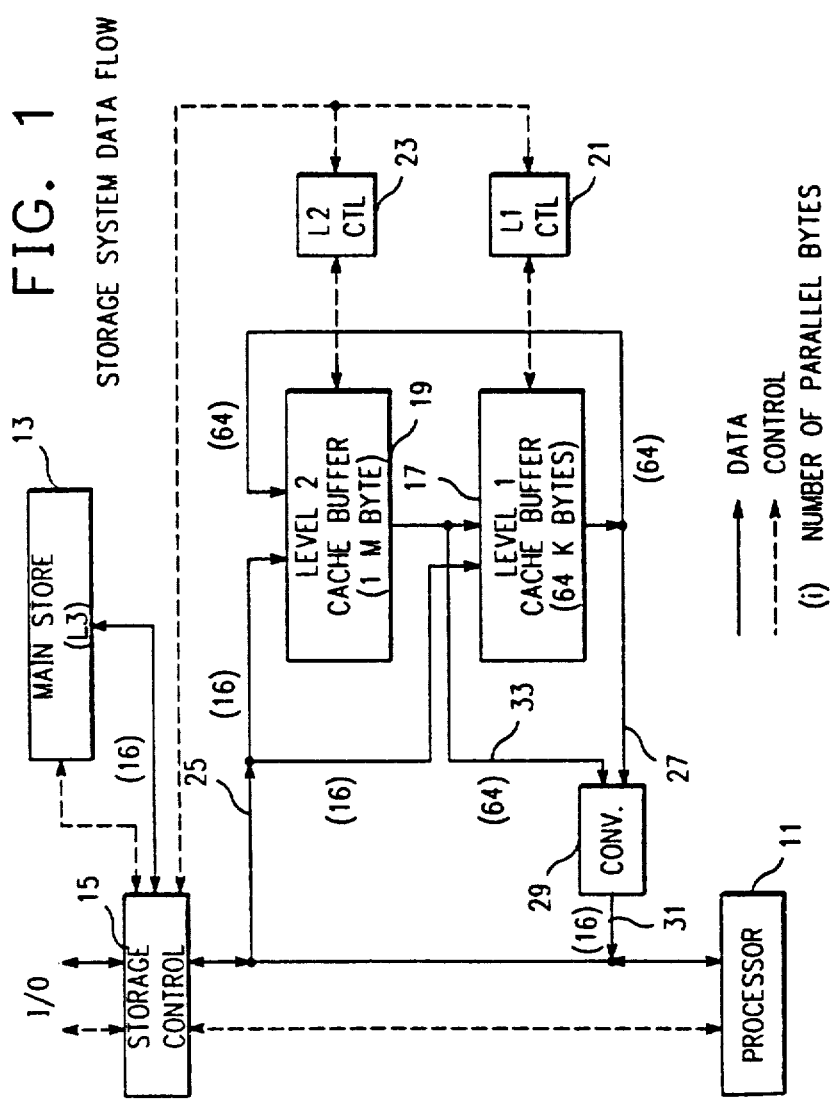
FIG. 1 is a block diagram of the data flow in a system in which the invention is implemented.

FIG. 1 is a block diagram of the storage system which will be disclosed as an embodiment of the invention. A processor 11 is connected to main storage unit 13 by a storage control unit 15. Two cache high speed buffer stores 17 and 19 are provided to improve the availability of operands and instructions to the processor. The arrangement of the caches in a two-level hierarchy (with the main store being in the highest level L3) brought further improvement, as was e.g. explained in above-mentioned IBM Technical Disclosure Bulletin article by F. J. Sparacio. Cache controls 21 (L1 CTL) and 23 (L2 CTL) are provided for the two cache stores, respectively, and are connected to main storage control unit 15.

The present invention is concerned with the internal organization of the cache buffer stores and their interconnections.

As can be seen from FIG. 1, the level 1 (L1) cache 17 has a capacity of 64 K bytes, and the level 2 (L2) cache 19 has a capacity of 1M bytes, i.e. L2 is sixteen times as large as L1. Data can be transferred from the main store via 16-byte wide bus 25 to the inputs of both cache buffers. From L1 cache 17, data can be transferred via 64-byte wide bus 27 to a second input of L2 cache 19, and also through a converter 29 to a 16-byte wide bus 31 which is connected to the processor 11 and also through the storage control to main store 13. From L2 cache 19, data can be transferred via 64-byte wide bus 33 to a second input of L1 cache 17, and also through the converter 29 and 16-byte bus 31 to the processor and to the main store.

More details of the two high-speed cache buffers will be disclosed in the following sections.

The bus width and storage sizes of this preferred embodiment are of course only one possibility. Other widths and sizes can be selected, depending on the design and application of the respective data processing system.

It is also possible to implement the invention in a multiple processor system. In such a multiprocessor system, a single common cache group can be provided between all processors and the common main store, or a separate local group of caches could be devoted to each of the processors with only the main store being commonly used. However, this is immaterial for the invention which is only concerned with the internal organization and interconnection of the multilevel caches, and their interface to the other units of the system.

(B) L1 CACHE, L2 CACHE, AND INTERCONNECTIONS

Figure 2:
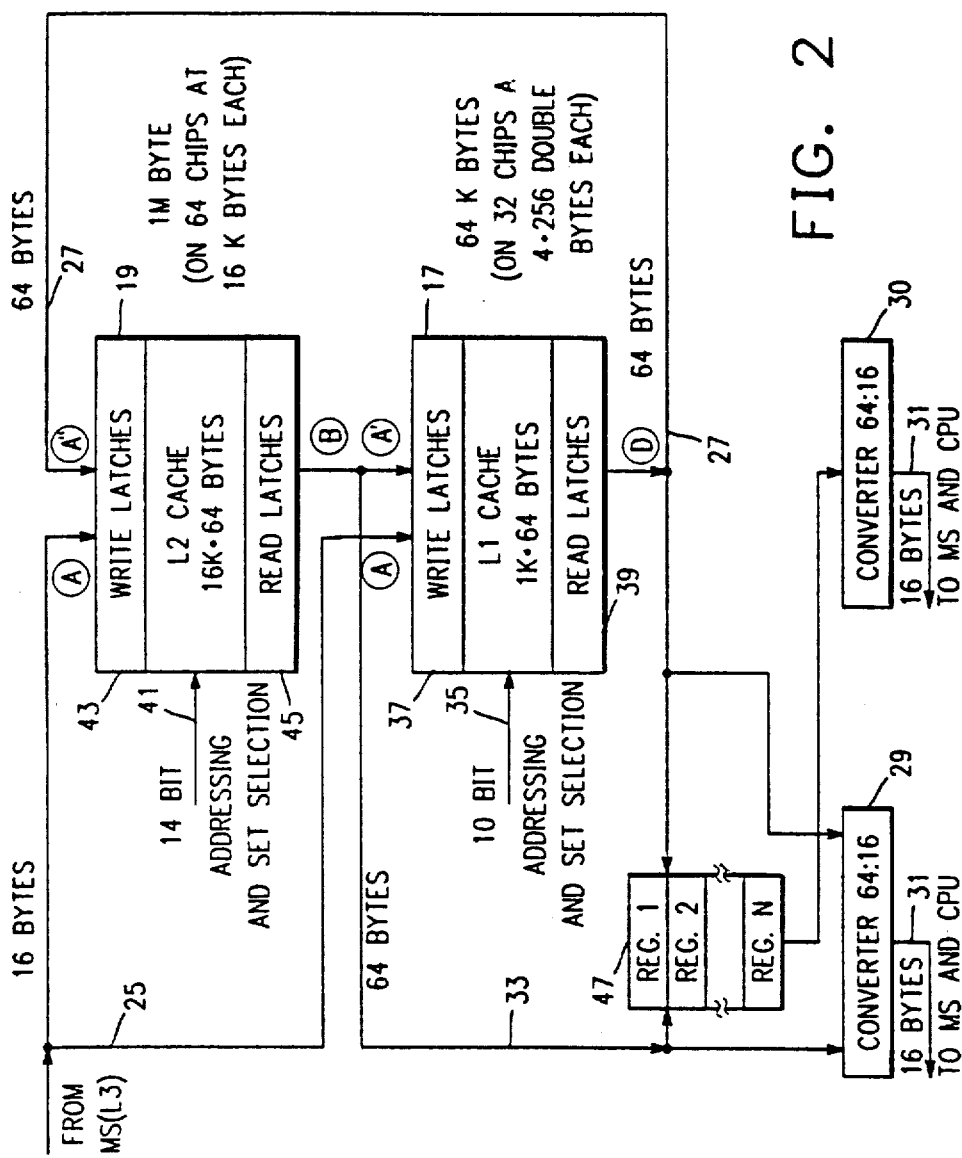
FIG. 2 shows more details of the two cache stores of FIG. 1 and their interconnections.

FIG. 2 shows some more details about the two caches L1 and L2 and their interconnections. Both cache buffers are so organized that data (operands, instructions) can be accessed in portions of 64 bytes, each such portion being designated as a "line" in the following. Thus, one line comprises 64 bytes or 576 bits (each byte including eight data bits and one parity bit, i.e. 1 byte = 9 bits).

Level 1 cache 17 with its capacity of 64 K bytes can hold 1024 (or 1K) lines of 64 bytes each. To select one line location for reading or writing 64 bytes, the cache needs the equivalent of 10 bits which are provided on a group of selection lines 35. Some of these selection bits are used for selecting a set (or subdivision) of the cache, and the others are used for addressing a specific location within the set. This will be explained in more detail in connection with FIG. 3.

L1 cache 17 has write latches 37 which can hold one line or 64 bytes of data. These latches are selectively loaded either from L2 cache via bus 33 (input A') or from main store in four sequential passes via bus 25 (input A). L1 cache 17 further has read latches 39 which also can hold one line = 64 bytes of data. Contents of these latches is furnished to bus 27 (output D).

Figure 3:
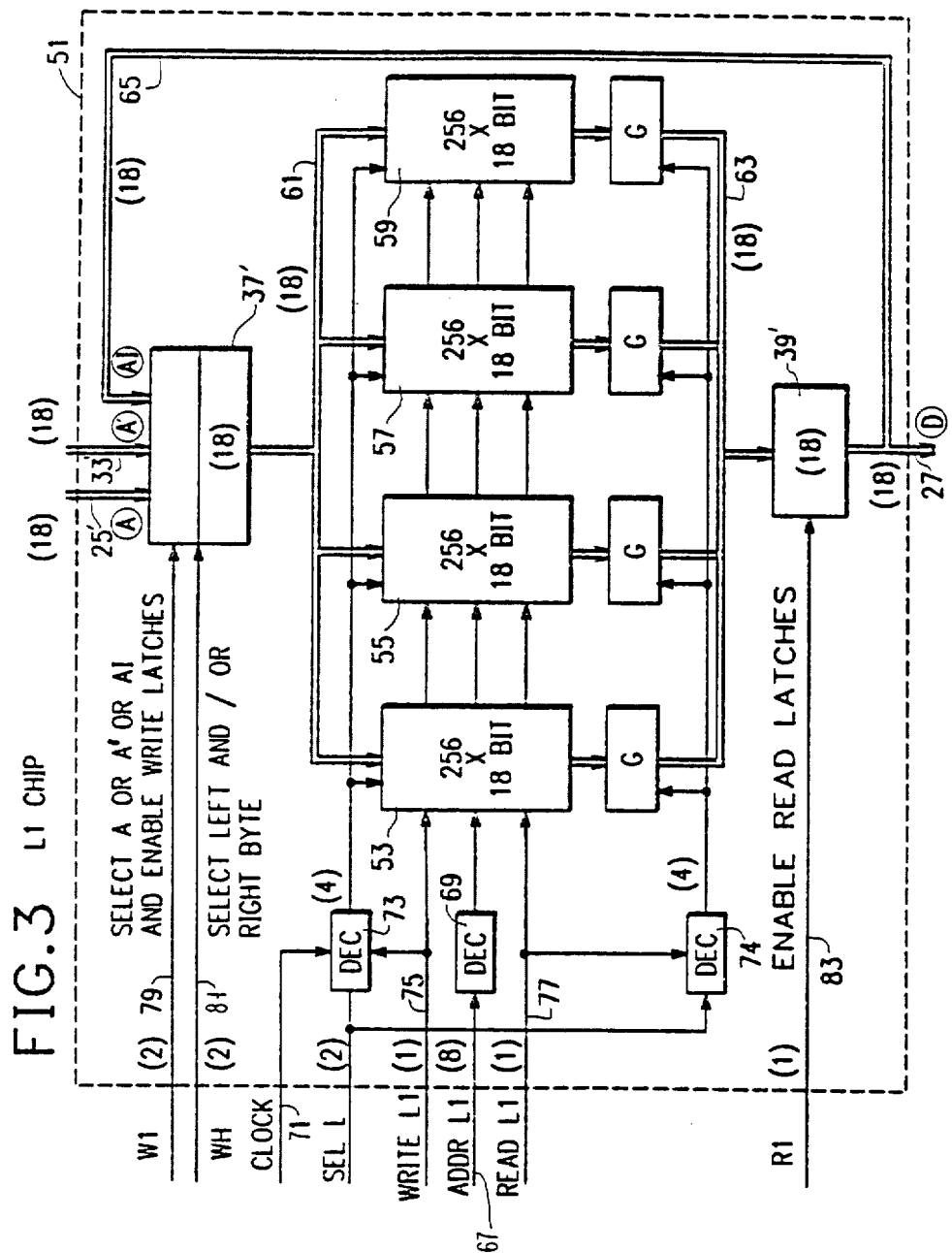
FIG. 3 illustrates the organization of a single chip of the level 1 cache store of FIG. 2, including control and data lines and on-chip latches.

L1 cache 17 is arranged on 32 integrated circuit chips, each holding four sets of 256 double bytes (as will be shown in more detail in FIG. 3). Of any stored line of 64 bytes, each chip holds one double byte. Thus, on each of the 32 chips, there are integrated write latches 37 for one double byte (18 bits) and also read latches 39 for one double byte (18 bits).

The access time of L1 cache chip is in the order of 3 ns or less.

Level 2 cache 19 is of similar but not identical design as L1. With its capacity of 1 M byte it can hold 16,384 (16 K) lines of 64 bytes each. For selecting any one of these lines, the equivalent of 14 selection bits are required which are provided on selection lines 41. Details of selection and addressing in L2 cache 19 will be explained in connection with FIG. 4.

L2 cache 19 also has a set of write latches 43 which can hold one line of 64 data bytes. These latches are selectively loaded either from L1 cache via bus 27 (input A'') or from main store in four sequential passes via bus 25 (input A) like the L1 cache. L2 cache 19 also has read latches 45 which can hold a line of 64 data bytes. Contents of these latches are furnished to bus 33 (output B).

Figure 4:
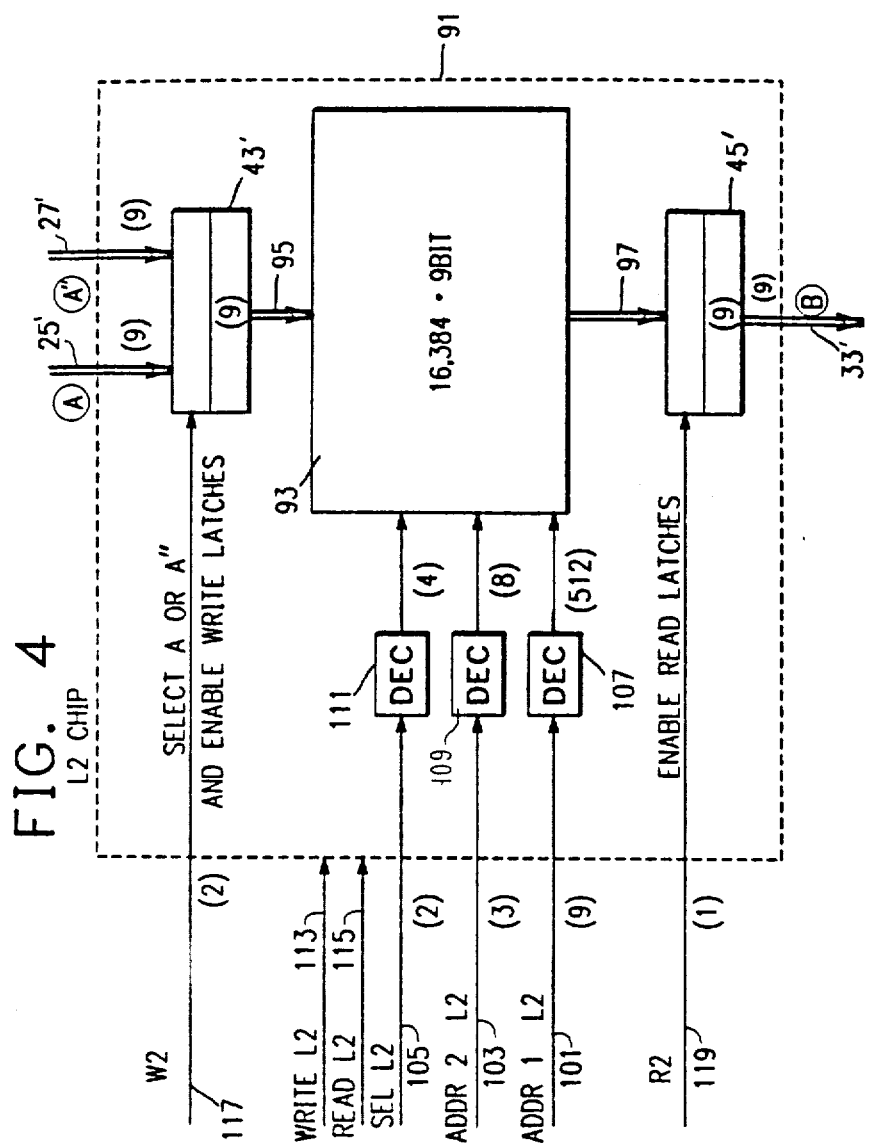
FIG. 4 illustrates the organization of a single chip of the level 2 cache store of FIG. 2, including control and data lines and on-chip latches.

L2 cache 19 is arranged in 64 integrated circuit chips, each holding 16 K single bytes (grouped in sets and subsets, as will be shown in more detail in FIG. 4). Of any stored line of 64 bytes, each chip holds one single byte. Thus, on each of the 64 chips, there are integrated write latches 43 for one byte (9 bits) and also read latches 45 for one byte (9 bits).

The access time of L2 cache chip 19 is in the order of 20 ns (or less), i.e. much longer than that of L1 cache 17 because of the larger size.

Converter 29 receives a 64-byte line from either L1 or L2, and releases it in four successive cycles in 16-byte portions (or sublines) to main store or processor.

Block 47 in FIG. 2 represents an array of N registers which each can hold a 64-byte line which was transferred to converter 29 from either L1 cache or L2 cache. These registers allow the re-use of lines of data without accessing again the respective cache high-speed buffer store. The registers feed a second 64:16 converter 30 to allow parallel cache and register read-out.

(C) LAYOUT AND CONTROL OF AN L1 CHIP

In FIG. 3, one of the 32 chips constituting the level 1 cache buffer store is shown. This L1 chip 51 comprises four arrays 53, 55, 57, 59 each for storing 256 double bytes (i.e. 256×18 bits). It further comprises write latches 37' for storing one double byte (18 bits), and read latches 39' for storing one double byte (18 bits). The 18 bits of write latches 37' are transferred via bus 61 to all four arrays, and bus 63 is provided to transfer 18 bits from any array to read latches 39'. Write and read latches are connected to external buses 25' (input A), 33' (input A'), and 27' (output D), respectively, as was shown in FIG. 2. (Of the total 64-byte capacity of each external bus, only two bytes, i.e. 18 bits are connected to each individual chip 51, as is indicated by the stroke in 25' etc.).

An extra feedback connection 65 is provided on the chip for transferring a double byte from read latches 39' back to write latches 37', thus forming a third input AI to the write latches.

For selecting any one of the 256 double bytes on each array, eight address bits (ADDR L1) are provided on lines 67 and are decoded in decoding circuitry 69. For selecting any one of the four arrays 53, 55, 57, 59, two selection bits (SEL L1) are provided on line 71 and are decoded in decoding circuitry 73 or 74, respectively. The clock signal and the write enabling signal (WRITE L1) on lines 75 are used for array control and timing during a write array operation. In a read operation, four double bytes—one from each of the four arrays—are read simultaneously, and one is gated by selected AND gate circuitry (G) at the end of the array cycle time. The selection is effected by an output signal of decoder 74 which receives the two array selection bits (SEL L1) on lines 71 and which is enabled by a read enabling signal (READ L1) provided on line 77. The signal on line 77 is also used for array control.

Thus, by the ten bits on lines 67 and 71 (which together constitute the selection lines 35 shown in FIG. 2), one of the 1024 double bytes stored in the respective chip can be selected. It will be shown in connection with FIG. 5 how these ten addressing/selection bits are developed from a given address.

As there are three inputs to write latches 37', a two-bit control signal 37 W1" is provided on lines 79 for selecting any one of the inputs A, A' and AI and for enabling write latches 37' to store the two bytes available on the selected input bus.

A further two-bit control signal "WH" is provided on lines 81 to gate either only the left byte or only the right byte of the two bytes available on the selected input bus, into write latches 37'. This enables selection of individual bytes, or the assembling of two bytes from different sources in a single byte pair.

A read control signal "R1" is provided on single-bit line 83 to read latches 39'. This signal when active enables read latches 39' to store the double byte currently available on bus 63, as read from one of the four storage arrays.

Control signals W1, WH and R1 (which are furnished by L1 controls 21) are an important feature of the disclosed storage system. They enable separation of internal operation of the chips/cache from external data transfers. Thus, despite different operating speeds or access times of caches L1 and L2 and the main store, direct transfers between the different storage levels are possible with a minimum delay, i.e. without requesting extra storage cycles.

(D) LAYOUT AND CONTROL OF AN L2 CHIP

In FIG. 4, one of the 64 chips constituting the level 2 cache buffer store is shown. This L2 chip 91 comprises a large array 93 of 16,384 (16 K) byte positions each holding nine data bits. It further comprises write latches 43' for storing one byte (9 bits) and read latches 45' for storing one byte (9 bits). Bus 95 connects the write latches to array 93, and bus 97 connects the array 93 to the read latches. Write and read latches are connected to external busses 25' (input A), 27' (input A"), and 33' (output B), respectively, as was shown in FIG. 2. (Of the total 64-byte capacity of each external bus, only one byte, i.e. nine bits are connected to each individual chip 91 as is indicated by the stroke in 25' etc.).

For selecting any one of the 16 K bytes on array 93, twelve address bits (ADDR1 L2, ADDR2 L2) are provided on lines 101 and 103, and two selection bits (SEL L2) on lines 105. (Lines 101, 103 and 105 together constitute the selection lines 41 shown in FIG. 2). These fourteen bits are decoded in decoding circuitry 107, 109, 111, and the respective signals select a set (or superline) in array 93 and one subset (line) within a selected set. It will be shown in connection with FIG. 6 how the addressing/selection bits are developed from a given address.

Additional lines 113 and 115 are provided for furnishing a write enabling signal (WRITE L2) and a read enabling signal (READ L2), respectively, to storage array 93.

A two-bit control signal "W2" is provided to write latches 43' on lines 117 for selecting one of the two inputs A and A" and for enabling write latches 43' to store the single byte available on the selected input bus.

A read control signal "R2" is provided to read latches 45 on single-bit line 119.

This signal when active enables read latches 45' to store the single byte currently available on bus 97 as read from storage array 93.

Control signals W2 and R2 (which are furnished by L2 controls 23) are an important feature of the disclosed storage system, in connection with the on-chip write and read latches, because these features significantly enhance the inter-level transfer capabilities of the cache storage hierarchy (as was already mentioned at the end of the previous section).

(E) ADDRESSING OF L1 CACHE

Figure 5:
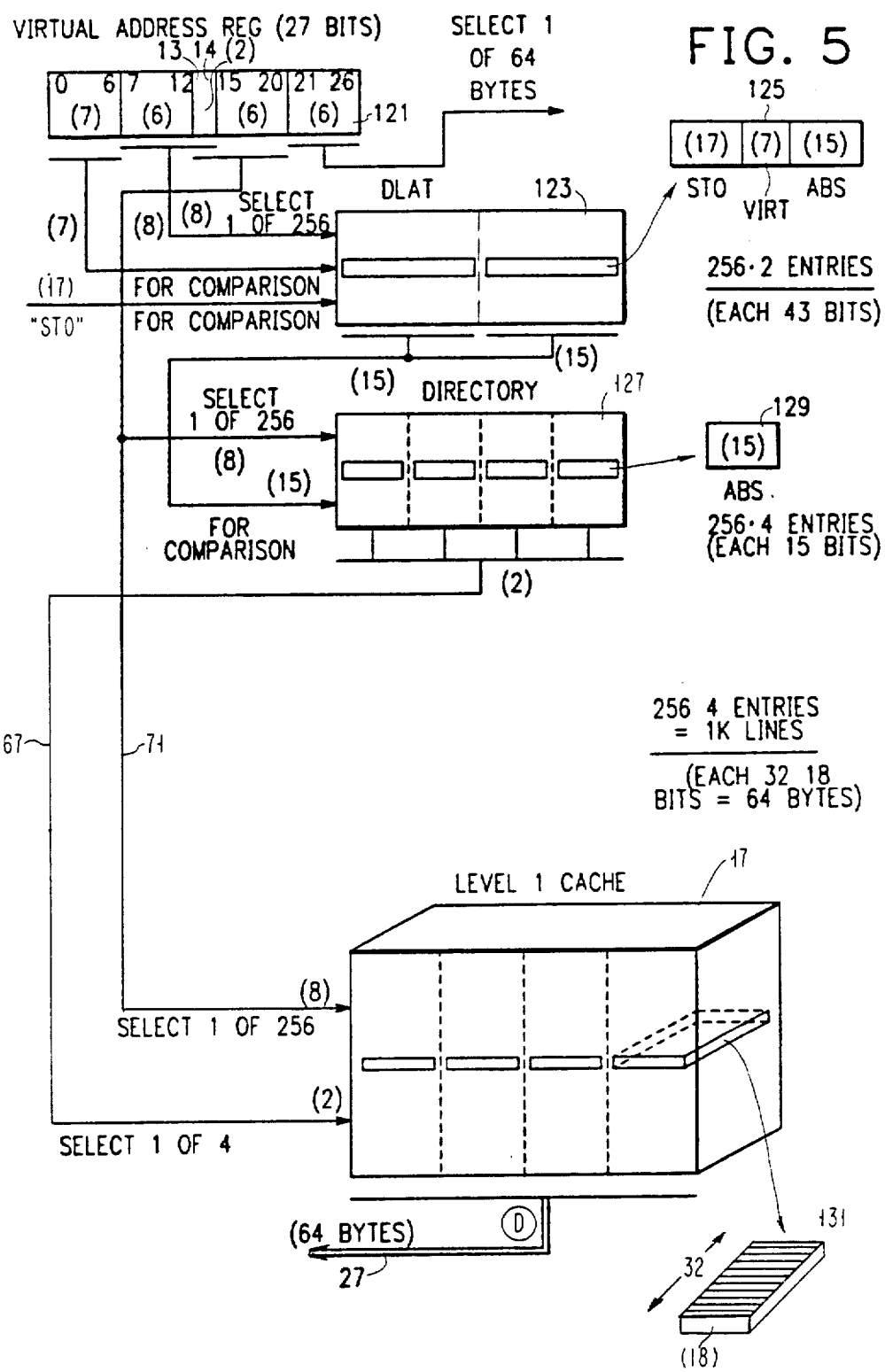
FIG. 5 shows the addressing structure for selecting a single 64-byte line of data in the level 1 cache store.

FIG. 5 illustrates how the addressing/selection signals for level 1 cache buffer store 17 are developed from a given address. The 27 bits of a virtual address are stored in register 121. The lowest-order 6 bits are used for selecting one byte of a 64-byte line read from the L1 cache. All other bits are used for addressing one 64-byte line in cache.

A directory look-aside table (DLAT) 123 is provided for storing recently translated addresses, as is wellknown in virtual storage systems. The DLAT is subdivided into 256 congruence classes. All virtual addresses in which bits 7... 14 are identical form one congruence class, or associative set. Thus, these eight bits are used to select the respective congruence class (or row) in the DLAT. Each congruence class has two entries 125, each of them storing a "STO" address field (17 bits), a virtual address field (7 bits) and the corresponding translated absolute address field (15 bits). Now when a congruence class was selected, the seventeen bits of a given "STO" address and the seven highest-order bits 0. .. 6 of the virtual address register are compared with the respective fields in the two DLAT entries. If no match occurs, a translation must be made and entered into DLAT. If a match occurs, the respective translated fifteen absolute address bits are furnished at the DLAT output.

Congruence classes that are different from the DLAT congruence classes are used for addressing the cache and its directory. For the cache, all virtual addresses in which bits 13. .. 20 are identical form one congruence class or associative set. These eight bits are transferred to L1 directory 127 and L1 cache 17 for selecting one congruence class (or row) of 256. The directory as well as the cache are 4-set associative, i.e. they have four entries per congruence class or row. In the directory, each entry 129 holds a 15-bit absolute address; in the cache, each entry 131 holds a whole data line of 64 bytes.

The fiveteen address bits furnished by the DLAT are compared in the L1 directory with all four entries of the selected row. If no match occurs (cache miss), the respective line must be fetched into the cache and the address entered into the directory. If a match occurs (cache hit), a two-bit signal identifying the respective set (column) is transferred to the L1 cache for selecting there the corresponding set (column).

Now the eight addressing bits and the two set selection bits are available on lines 67 and 71 of the cache, respectively, and can be used for selecting a double byte on each of the 32 cache chips, as was explained in connection with FIG. 3. The 64-byte line is then stored in the read latches of all chips, and becomes available on output bus 27.

(F) ADDRESSING OF L2 CACHE

Figure 6:
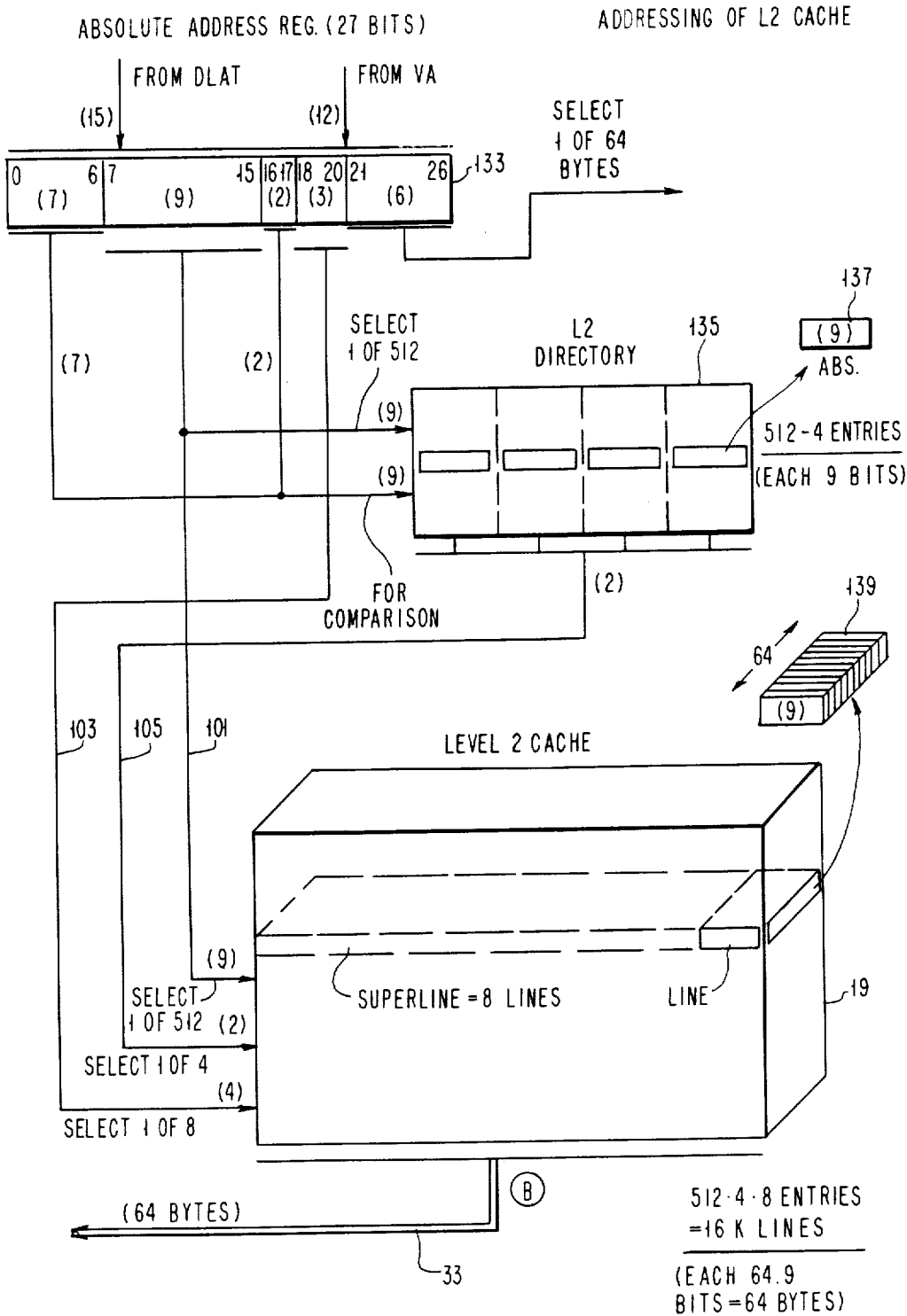
FIG. 6 shows the addressing structure for selecting a single 64-byte line of data in the level 2 cache store.

FIG. 6 shows how the addressing/selection signals for level 2 cache buffer store 19 are developed from a given address. It is assumed that the virtual address was already translated into a 27-bit absolute address which is stored in a register 133. The twelve low-order bits 15. . . 26 are taken directly from the virtual address whereas the 15 high-order bits 0. . . 14 are obtained from a directory look-aside table DLAT, as was explained for L1 cache in connection with FIG. 5.

The six lowest-order bits 21. . . 26 of the absolute address are used for selecting one byte of a 64-byte line read from the L2 cache. All other bits (0. . . 20) are used for addressing one 64-byte line in cache.

The level 2 cache and its directory are also subdivided into congruence classes. The nine bits 7. . . 15 of the absolute address determine the congruence class so that 512 classes can be distinguished.

L2 directory 135 has 512 rows (for the 512 congruence classes) each comprising four entries 137 (4-way associativity). Thus 4×512=2,048 data sets can have their address in the L2 directory. Each such data set is a superline comprising eight 64-byte lines stored in 64 chips in the cache.

Addressing of a superline is as follows: The nine bits (7. . . 15) determining the congruence class select one row in the L2 directory. Nine further bits of the absolute address (bits 0. . . 6 and 16 and 17) which identify the superline (8 lines) are furnished to the directory and are compared with the four 9-bit entries in the selected row. If no match occurs (cache miss), a fetch in main store must be made and the directory updated. If a match occurs (cache hit), then the respective column is identified by a bit pair furnished at the output of L2 directory 135. This bit pair determines where within the respective congruence class the addressed superline is located in cache.

L2 cache 19 receives the nine bits determining the congruence class (which could be designated as "row" in cache) on lines 101, and it receives the four bits determining the set or superline within that congruence class (or row) on lines 105.

To finally select a single 64-byte line 139 within the superline, three absolute address bits (18. . . 20) are furnished to L2 cache on lines 103. Thus, fourteen bits are available at the inputs of the cache to select one 64-byte line out of the totally stored 16 K lines. Each of the 64 chips of the L2 cache furnishes one byte (9 bits) of the selected line, and all 64 bytes appear simultaneously on output bus 33.

For writing into the caches, the same addressing mechanism is used as described above for reading.

We claim:

1. A cache module for permitting the efficient transfer of m byte wide data entities between a fast, level L1 cache and a slower level L2 cache in a single access of said L1 and L2 cache, where m bytes is the width of a single cache line and is greater than 16 bytes, wherein:

said L1 cache includes an array of $n$ memory circuits, such that $n$ times the number $p$ bits accessed per memory circuit equals $m$, and further having $m$ byte wide input means and $m$ byte wide output means for respectively receiving and transmitting said $m$ byte wide data entity between said L1 and L2 caches;

said L2 cache including an array of $x$ memory circuits, such that $x$ times the number $y$ bits accessed per memory circuit equals $m$, and further having $m$ byte wide input means and $m$ byte wide output means for respectively receiving and transmitting said $m$ byte wide data entity between said L1 and L2 caches;

intercache bus for coupling said L1 and said L2 caches comprising first $m$ byte wide coupling means for coupling said L1 cache output means to said L2 cache input means and second $m$ byte wide coupling means for coupling said L2 cache output means to said L1 cache input means;

a common main storage data bus coupled to said main storage, said main storage data bus having a width that is a fraction $w/m$ of said inter-cache bus first and second $m$ byte wide coupling means width, said input means of said L1 and L2 caches being coupled to said common main storage data bus; at least one output data bus having a width of $m$ bytes coupled to said output means of said L1 and L2 caches;

first converter means for sequentially furnishing fractions of a $w/m$ wide data block to said processor and/or said main storage data bus having only said fractional width $w/m$, said first converter means being coupled to said output means of said L1 and L2 caches via said at least one output data bus;

register array means having a capacity of at least $m$ data bytes coupled to said output data bus, for storing at least one data block of $m$ bytes from said first converter means; and second converter means coupled to said register array means, for sequentially furnishing fractions of any m-byte data block stored in said register array means to said processor and/or main storage data bus.

2. The cache module according to claim 1 wherein said input means and output means comprise, respectively, input latches and output latches, respectively, for holding data to be written into or read from said memory circuits.

* * * * *